July 24, 1962 P. J. WEAVER 3,045,435
MACHINE TOOL CONTROL
Filed Dec. 15, 1958 3 Sheets-Sheet 1

FIG. 1

INVENTOR.
PAUL J. WEAVER
BY
Angus & Mon
ATTORNEY.

United States Patent Office 3,045,435
Patented July 24, 1962

3,045,435
MACHINE TOOL CONTROL
Paul J. Weaver, Downey, Calif., assignor, by mesne assignments, to Banstrom Industries, Inc., Los Angeles, Calif., a corporation of Connecticut
Filed Dec. 15, 1958, Ser. No. 780,434
13 Claims. (Cl. 60—97)

This invention relates to machine tools, and in particular to control systems applicable to contour cutting machinery.

In the cutting of a workpiece to reproduce the contour of a template therein, die-sinking being a familiar example, it is customary to provide a tracer valve in a first axis, usually vertical, which is adapted to move the knee of a milling machine either up or down in response to undulations of a template or pattern which is being copied. In order to move the tracer valve along the template, and the associated cutter along the workpiece, some type of motor is actuated which moves the milling machine table along a second axis, usually the axis of longitudinal feed, so that the tracer valve traces along on a vertical plane in the template. Such second axis movement is herein called the "feed movement."

It is desirable to slow the feed movement rate in the horizontal axis when the tool must plunge into the workpiece to form a cavity, or when it must rise out of the workpiece to form a rising wall. This is for the reason that it is best to keep the feed speed approximately constant along the surface being generated by the cutter. Skillful die sinkers are able to approximate such an arrangement by eye, and numerous attempts have been made to accomplish this objective automatically. A means for accomplishing this reduction in speed automatically is shown in applicant's co-pending patent application Serial No. 748,426, filed July 14, 1958, entitled "Pattern Controlled Machine Tool." The instant invention is particularly useful in connection with the tool and control shown in the aforesaid co-pending application.

After the cutter has cut along one plane, it is desired for it to be stepped over in a third axis, usually but not necessarily the crossfeed, by an incremental distance so that the cutter may be fed relative to the workpiece along a new plane spaced from the first so as to machine the next section of the contour of the workpiece. Such third axis feed is herein called a "pick movement."

Accordingly, the operation of a die sinker (and of three-dimensional reproduction work in general) consists of tracing back and forth along a first, usually longitudinal, axis, and stepping along the crossfeed axis at the end of each stroke while the table lifts and falls in a vertical axis to duplicate the undulations of the pattern in the workpiece. It is to be understood that the actions of the crossfeed and the longitudinal feed may be reversed so that the pick movement occurs along the longitudinal axis, while the feed movement occurs along a plane that is parallel to the crossfeed axis.

Accordingly, a useful control circuit and one which it is the object of this invention to provide, is able to cause the worktable of a machine tool to reciprocate back and forth in a feed movement along one axis while stepping over incrementally in a second axis at the end of each feed movement.

Additional but optional objects of this invention reside in providing means whereby the rate of travel during pick movement and the incremental distance of pick movement can be adjusted, and means whereby the machine can be utilized either as a conventional machine tool or as an automatically controlled machine tool.

It is a further object of this invention to provide a simplified control means for actuating the power mechanisms for moving the machine tool elements.

A feature of this invention resides in providing a control circuit for machine tools of the above-described type in which its cycling operation can be made automatic.

A preferred but optional feature of this invention resides in providing signal and power means for controlling the cycling operations which are pneumatically powered and which include a number of off-on valves so arranged as to duplicate the function of four-way valves, thereby providing a simple, expedient, compact and inexpensive control element.

The above and other features of this invention will be fully understood from the following detailed description and the accompanying drawings, in which.

Figure 2:
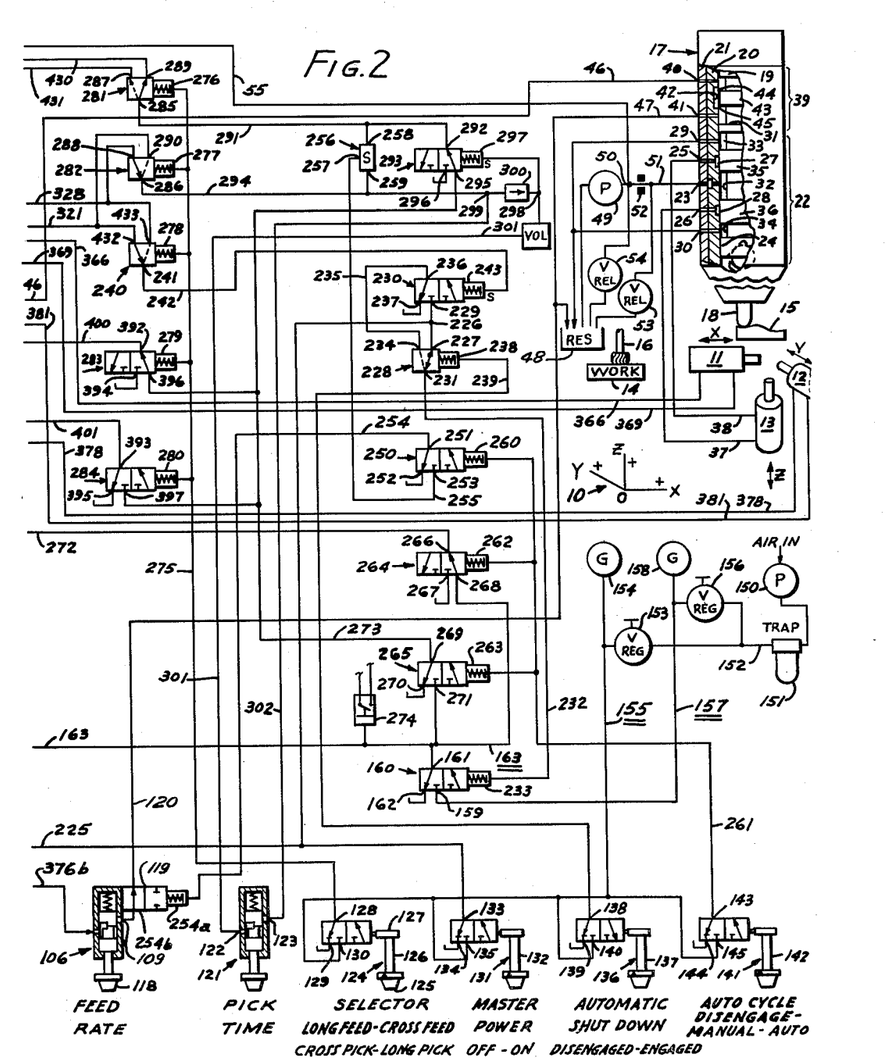
FIG. 2 is a circuit diagram of another part of the control system according to the invention, FIGS. 1 and 2 being adapted to adjoin in edge-to-edge relationship.

The elements of a machine tool pertinent to a description of the instant invention are shown in the upper right-hand corner of FIG. 2. Certain conventional parts of the machine tool which are known to every machinist are not shown in the drawings, in order to simplify the drawings. The machine operates along three principal axes, shown as the common left-hand cartesian coordinate arrangement 10, the coordinates being labeled X, Y and Z from an origin O, in accordance with common notation. The X axis is customarily known as the longitudinal feed, the Y axis the crossfeed, and the Z axis the knee feed for vertical movement.

In accordance with well-known machine tool construction, a worktable (not shown) is so supported and arranged as to be moved along the X, Y and Z axes, or in any combination thereof, as a result of operation of X, Y and Z axis motors 11, 12, 13, respectively. These motors are shown as conventional cylinder-and-piston types, but it will be understood that these are simply illustrative examples of useful motors and that they could as well have been hydraulic gear-type motors, hydraulic cylinders, or any other variable speed motive means.

A workpiece 14 and a template or pattern 15 are customarily supported upon the worktable so as to be moved in unison, and a milling cutter 16 and a tracer valve 17 are supported by unitary supporting structure so as to retain their spatial inter-relationship. Therefore, movement of the template and workpiece in unison relative to the tracer valve and the cutter, respectively, will cause the cutter to duplicate in the workpiece the contour of the template or pattern.

For full details of tracer valve 17, reference may be had to the aforesaid co-pending application, Serial No. 748,426. However, a brief description of certain portions of this tracer valve that are pertinent to this invention will be given here. The tracer valve has projecting therefrom a pivotally-mounted stylus 18, the tip of which stylus is pivotable in any lateral direction relative to the X-Y plane, and is also reciprocable along the Z axis. Tilting movement of the stylus from its neutral vertical position will result in upward movement of a valve spool 19 in the tracer valve, as will upward movement of the stylus, while a downward movement of the stylus, or its return toward the vertical, will cause the valve spool to move downward.

The valve spool is contained in a valve sleeve 20, both of which are enclosed by a housing 21. The valve sleeve and valve spool are provided with staggered grooves for the purpose of appropriately directing and controlling the flow of hydraulic fluid in accordance with the position of the spool within the sleeve. The spool position is, of course, determined by the contact between the stylus and the template, and is therefore the direct controller on the machine for causing the machine to accurately duplicate the shape of the template in the workpiece.

The tracer valve has a lower 180° sector 22 (sometimes called a "tracer sector") which comprises a four-way valve. A central pressure port 23 through the housing and the valve sleeve opens into spool passage 24 opposite a central pressure groove 32 and on each side thereof there are motor supply ports 25, 26 through the housing and sleeve which terminate at motor supply grooves 27, 28, respectively. These grooves extend circumferentially in the spool passage. Exhaust ports 29, 30 pass through the housing and the valve sleeve on opposite sides of the pair of motor supply ports and open into spool passage 24 opposite exhaust grooves 33 and 34.

The valve spool is provided with a dividing land 31. Below the dividing land there are formed three circumferential grooves. One is a central pressure groove 32 which stands opposite the pressure port 23 and remains continuously in communication therewith. Exhaust grooves 33, 34, each of which is in constant communication with exhaust ports 29, 30, respectively, are on opposite sides of groove 32. Lands 35, 36 are between pressure groove 32 and exhaust groove 33 and between groove 32 and groove 34, respectively. Lands 35, 36 are respectively opposite motor supply grooves 27, 28. When the spool is shifted one way from the neutral position shown, it will be seen that one of the lands will shift off of its respective motor supply groove so as to open the groove to pressure from the pressure groove, and the other land will move off the other groove so as to connect it with its respective and adjacent exhaust groove. This permits flow of fluid under pressure to one or the other of Z axis supply conduits 37, 38, which are connected to the Z axis motor, and flow to exhaust from the other conduit, thereby operating Z axis motor in one direction. Shifting the spool in the other direction from the neutral position shown will cause fluid to flow in the opposite directions in the conduits, and move the motor in the other direction.

The tracer valve also has an upper feed control sector 39. This sector is provided with a pair of ports 40, 41 which pass through the housing and sleeve and open into the spool passage above the dividing land 31. A by-pass groove 42 is formed in the wall of the spool passage and extends circumferentially. A land 43, which has a lesser axial length than the width of by-pass groove 42, stands opposite the by-pass groove and with the spool in the centralized position as illustrated, permits fluid to flow between ports 40 and 41 through restrictions 44, 45 formed between the groove and land 43 at each end of the land. It will be appreciated that whichever way the spool moves from the neutral position shown, one of these restrictions will be decreased in area and that the volume which can flow between the ports will thereby be reduced. Greatest flow between ports 40 and 41 can occur when the valve is in its neutral position as shown. An inlet conduit 46 connects with port 40 while an exhaust conduit 47 connects with port 41. Conduit 47 discharges into a reservoir 48.

A hydraulic pump 49 withdraws fluid from reservoir 48 and pressurizes the same. The pump outlet is connected to a T-joint 50. A tracer valve supply conduit 51 branches from the T and connects to pressure port 23 in the tracer valve. An orifice 52 of dimensions to be discussed is fitted in supply conduit 51. A first relief valve 53 is fitted in the supply conduit between the tracer valve and orifice 52, and a second relief valve 54 is fitted in the conduit between the T-joint 50 and the pump. From T-joint 50 a feed supply conduit 55 passes to the control circuit to be described.

The operation of the equipment described thus far is briefly as follows. The lower 180° tracer sector 22 of the tracer valve controls the operation of the axis motor to raise or lower the knee in accordance with the contact between the template and the stylus. It is this up-and-down movement which will hereafter be termed "tracer movement." The upper rate control sector 39 of the valve will be connected through the control system to be described to one or the other of the X or Y axis motors. The movement of whichever motor is controlled by sector 39 will be called the "feed movement," and it will be observed that there will be a maximum rate of movement which occurs along the axis controlled by sector 39 when the spool is in the neutral position shown in FIG. 2. Whenever the spool is displaced in either direction from the central position, then the rate of flow through the sector will be cut down so that the rate of fluid flow to the motor operating as feed motor will be diminished. It is this modulated rate of feed, coordinated with the up-and-down movement of the Z cylinder motor, which results in a sensibly constant rate of movement of the cutting tool along the surface of the workpiece in which the desired contour is being generated.

The remaining motor X or Y which is not under control of sector 39 will be operated step-wise in a movement called "pick movement" which will step over the worktable each time a feed stroke is completed. It will be understood that it is most desirable and in the control system to be described the result is attained, that the X and Y axis motors will be intermittently actuated; that is to say, pick movement will occur only at the end of feed strokes. It is the purpose of the control system which is to be described to set forth a means of providing for the intermittent operation of the X and Y motors, and to enable this movement to be automatic.

It is to be appreciated that the Z motor is actuated entirely independently of the control system which is to be described, the control system being effective in the system only in one plane, in the case illustrated, the X-Y plane.

The control system as shown utilizes compressed air as a signal and actuating means to control the operation of valves which themselves control the flow of hydraulic fluid to the motors. It is to be understood that the various valves are in effect switches and that, while the use of pneumatic force for pilot actuation to control hydraulic liquid as an actual working fluid is given as a single and the preferred example, it is also possible to design analogous systems which fall within the scope of this invention which utilize other power sources, such as electrical or electronic control of hydraulic or electric motors, pneumatic control of electric motors, etc. It has been found that in a machine tool, the use of compressed air for actuating control devices and for carrying signals has many advantages, not the least of which is the fact that if a leak occurs, hydraulic fluid does not spill on the floor. Also, considerable forces can be obtained even when small lines are used. For example, the valve shown in FIG. 10, which is extensively used in this system, requires 100 pounds of direct force to move the hydraulic control sector. Were an electric solenoid to be used for such a purpose, a very large solenoid carrying a heavy current would be required to produce this much force. Such an installation would be impractical, because of the heavy currents needed, and because the bulk of the equipment would be far greater than is tolerable.

On the other hand, with the use of compressed air, relatively small valves can be used which are capable of utilizing air pressures between 30 and 90 pounds per square inch, and this enables a large operating force to be obtained in a small valve. A small control box can then be used. In fact, the entire extensive system shown in FIGS. 1 and 2 has in actual practice been contained in a pair of boxes whose total volume does not exceed about one cubic foot. Such a small bulk is simply not attainable when other types of energy, particularly electrical, are used.

Figure 3:
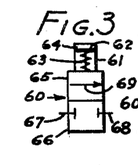
FIGS. 3–6 are schematic illustrations of the valve notation utilized in FIGS. 1 and 2.
Figures 4, 5, 6:
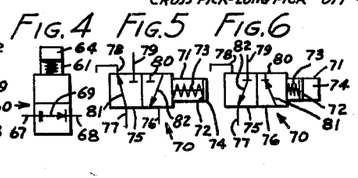
Figure 10:
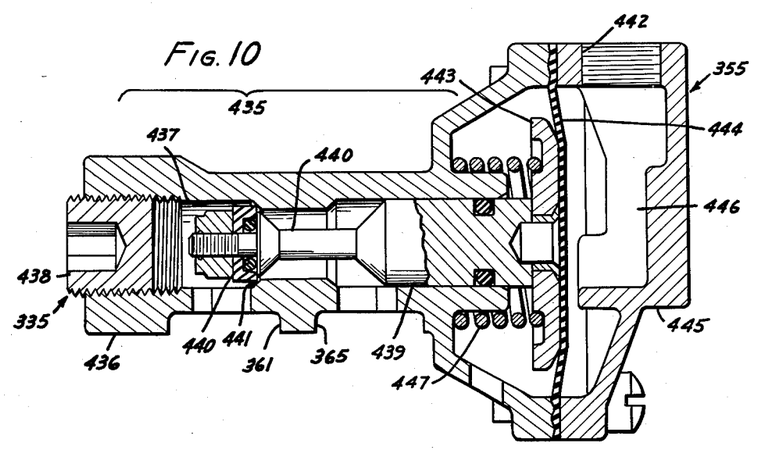
FIG. 10 is a side view, partly in cross-section, of another valve used in the invention.

Inasmuch as this control system is quite extensive and utilizes many valves having various choices of settings, a standard system of notation has been used for indicating the actuated and unactuated conditions of the valve. Although this system is well-known, two examples of the notation are shown in FIGS. 3–6 which will be explained at the present time in order to make the remainder of the application intelligible. FIGS. 3 and 4 show an unactuated and actuated condition of a valve 60. The physical construction of this valve is shown in FIG. 10, and will be fully described below. In FIG. 3 an upper section 61 illustrates the control portion of the valve. There is a line 62 which schematically shows a diaphragm or piston which is movable by pneumatic pressure. A spring 63 biases the diaphragm to its unactuated condition. A space 64 above line 62 is relatively small in FIG. 3, to indicate that there is no actuating pressure at the condition illustrated.

There are two lower sections 65, 66 in the notations. These illustrate the hydraulic valving portion. The lower section has terminals 67, 68, which terminals comprise hydraulic fluid connections to the valve. The upper section 65 contains an arrow 69 which represents a hydraulic connection which can be made by valve 60.

In the illustrated system of notation, actuation or de-actuation of the switch will reverse the section in which the arrows stand. For example, in FIG. 3 the valve is shown by the small space 64 as unactuated and arrow 69 is in section 65. No arrow connects terminals 67 and 68, and this indicates no flow connection between them. There are no terminals joined by the arrow in FIG. 3. The valve is closed.

In FIG. 4 space 64 is shown larger, with line 62 moved down, as though by pressure applied to the upper section 61. This means that the valve is in its other condition, and it will be noted that the arrow 69 has moved into the lower section. There having been no arrow in section 66, this "notation" of no arrow has moved into section 65 from section 66. It will now be seen that in FIG. 4 there is a direct fluid connection between terminals 67 and 68. Therefore, FIGS. 3 and 4 show an off-on valve in which fluid flow is cut off between the terminals when the valve is unactuated, and which makes fluid communication between the terminals when the valve is actuated.

FIGS. 5 and 6 show another example of this notation. They illustrate a selector valve 70. The selector valve has an actuation section 71 having a line 72 with an indication of a bias spring 73. In FIG. 5 the device is shown in its unactuated condition with a space 74 which is relatively small, indicating that there is no actuating pressure against the diaphragm or piston which is symbolically indicated by line 72. On the other hand, in FIG. 6 space 74 is shown much larger, and line 72 has been moved to the left, indicating that actuating pressure is on in the actuating section.

Selector valve 70 is shown as having two hydraulic control sections 75, 76. Control section 75 has a common inlet 77 and two terminals 78, 79. The term "common" port, or "common" inlet will frequently be used herein to describe a port which is capable of being connected to different ones of other ports.

Terminal 78 has a small hook on its end indicating that it is a vent. Another terminal 80 is shown in section 76, but it will be observed that it does not pass outside the schematic illustration of a case. Such a notation means the terminal is plugged off and is not used for a fluid connection. It illustrates one detail of the physical construction of the valve and is of no interest to the actual circuit through the valve.

A pair of arrows 81, 82 is provided. As shown, arrow 81 inclines upwardly to the left and arrow 82 inclines downwardly to the left, and they are disposed respectively in sections 75 and 76 when the valve is unactuated as shown in FIG. 5. At that time the common inlet 77 is connected by passages symbolically indicated by arrow 81 to terminal 78 which means that that inlet is vented. The arrows show the direction of flow.

When the valve is actuated, as shown in FIG. 6, the arrows switch blocks, and it will be seen that arrow 82 is now in block 75 while arrow 81 is in block 76. At this time terminal 79 is connected to inlet 77 while the vent is closed off. It is believed that the above will sufficiently indicate the use of the standard JIC notation.

Certain manually adjustable parts of the control circuit will now be described. There is a cross-feed control handle 90 which has a shaft 91 that includes a cam 92 for actuating a pair of valves 93, 94. The cam is designed with a single rise so that when moved to the left in FIG. 1 the left-hand valve is actuated, and when moved to the right the right-hand valve is actuated. When in its central position as shown, neither valve is actuated.

Figure 1:
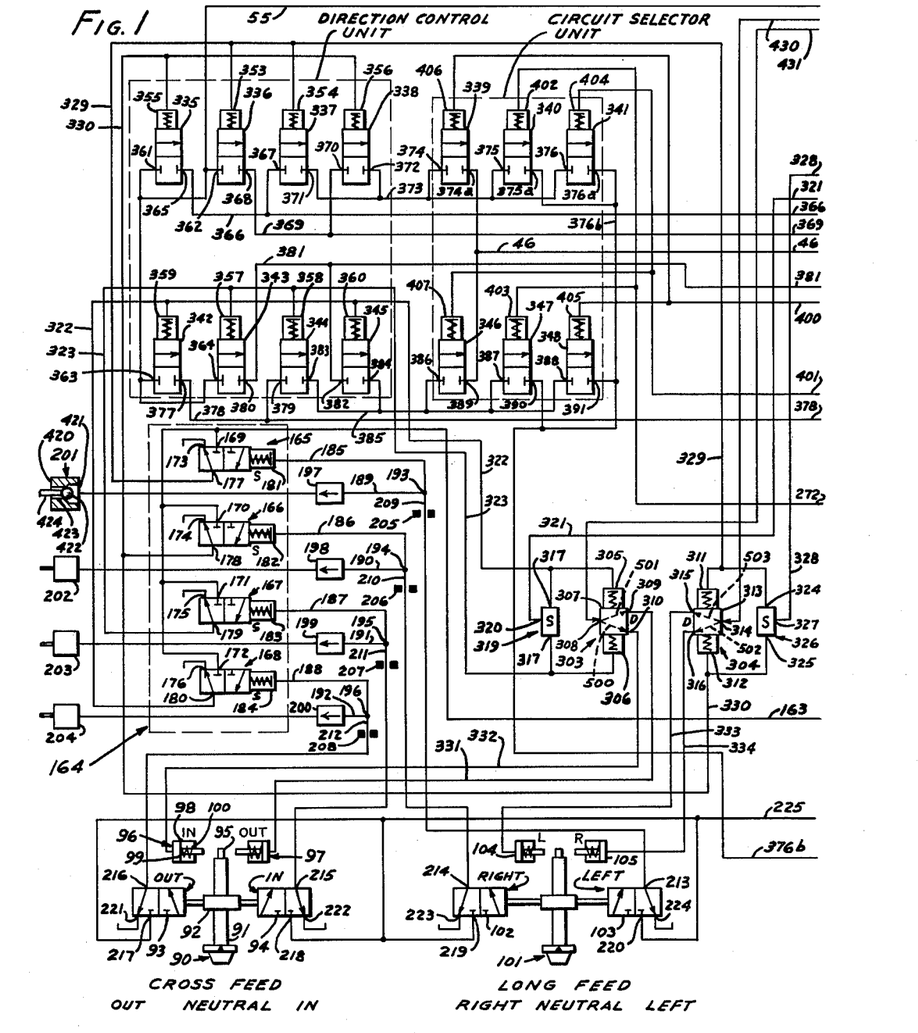
FIG. 1 is a circuit diagram of one part of a control system according to the invention.

At the upper end of the shaft there is an arm 95 which is positioned between two spring-loaded actuators 96, 97. These actuators are pneumatically operable. Each includes a cylinder 98, a plunger 99 and a spring 100, which biases the plunger away from the arm. When one of the actuators is actuated, the plunger strikes the arm and moves the arm away from it, thereby turning the shaft so that the cam actuates one or the other of valves 93 or 94, depending on which of the actuators is operated.

There is a longitudinal feed control handle 101, which controls valves 102, 103 and which is operable by actuators 104, 105 in the same manner as cross-feed handle 90. It will be appreciated that both handles 90 and 101 are exposed for access by the machinist and, as will be seen below, can be used to determine the direction of table movement, and to provide for operation as a conventional milling machine.

A feed rate valve 106 is shown installed in the circuit in FIG. 2. This valve is shown in full structural detail in FIG. 7, to which reference should now be had. The valve includes a housing 107 which has an inlet 108 and an outlet 109. A circular cylindrical spool passage 110 is formed in the housing. At the top of the spool passage, disposed between the housing and a valve spool 111, there is a bias spring 112 which presses the spool downward in FIG. 7 so that it tends to make contact with a cap 113 or with some other restraining element attached to the housing.

Figures 7, 8:
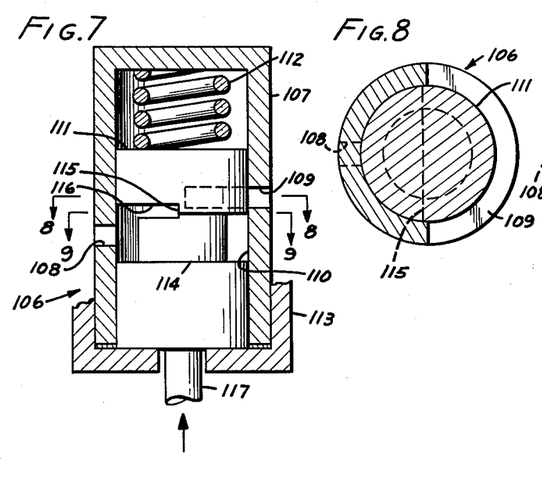
FIG. 7 is an elevation, partly in cutaway cross-section, showing details of one of the valves of the invention.
FIGS. 8 and 9 are cross-sections taken at lines 8—8 and 9—9, respectively, of FIG. 7.
Figure 9:
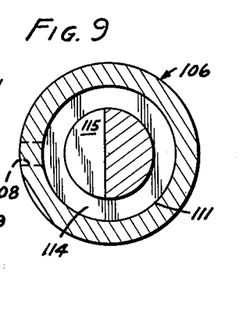

The spool has a circumferential groove 114, which groove is modified by a diametrical notch 115 that extends across about one-half of the area of the groove. The upper edge 116 of the notch tends to widen the notched part of groove 114. Outlet 109 is a substantially 180° slit through the wall of the housing. The outlet is "walled in" as appropriate, so that fluid from the outlet can flow out a small port.

Both outlet 109 and notch 115 subtend slightly less than 180°, so that at the rotational position of the spool in the housing shown in FIG. 7 the notch and the outlet do not overlap. At this position, the groove is not wide enough to overlap any part of the outlet and there can therefore be no flow through the feed rate valve at that position. However, the upper edge 116 of the notch is high enough from the cap that it would, if properly situated angularly, overlap a portion of the outlet, and therefore permit restricted flow between the inlet and the outlet.

As can best be seen from FIGS. 7 and 8, if the spool were rotated slightly, there would be an overlap between edge 116 and outlet 109 and this overlap will be a small one, permitting metered flow between inlet and outlet. The amount of the flow would, of course, be increased by increasing the area of the flow orifice by turning the spool farther and farther so that more and more of the notch 115 comes into registration with outlet 109. The maximum flow possible with the spool in its lowermost position, as shown in FIG. 7, would occur when the spool is turned about 180° away from the position shown in FIG. 7.

In the event that a quicker movement is desired for the machine tool element whose rate is limited by this valve, rapid traverse is provided for by shaft 117 which connects to handle 118. Regardless of the angular position of the spool in housing 107, if the spool is shifted by pressing on handle 118, the groove will come into registration with the outlet, and a large volume flow can occur from inlet to outlet. This provides for a quick traverse movement.

When force is taken off shaft 117, bias spring 112 restores the spool to its lowermost position, as shown, and then the flow through the valve is again regulated entirely as a function of overlap between edge 116 and outlet 109. Feed rate valve 106 has its outlet governed by a valve 119, which valve is a standard off-on type. The outlet 109 is connected to one terminal of valve 119 and the outlet of valve 119 is connected to an exhaust conduit 120.

A pick time valve 121 is also attached to the control panel of the instrument. It comprises a valve structure which is identical to that of feed rate valve 106. Timer valve 121 has terminals 122 and 123 through which the passage of air is controlled. Valves 106 and 121 differ in their operation in that valve 106 controls flow of hydraulic fluid, while valve 121 controls flow of air. The construction of timer valve 121 can be made the same as that of valve 106, thereby reducing the number of custom components in the system.

A selector valve 124 has a handle 125 mounted to the control panel. The handle is connected to a shaft 126 which carries a cam 127 for placing the selector valve in one or the other of two conditions. As shown in FIG. 2, the selector cam is in the left-hand position so that connections are made as indicated by the arrows. It will be understood that if the selector handle were turned to its other position that the locations of the arrows would be exchanged. Valve 124 has a common port 128, a vent port 129, and a pressure port 130. Valve 124 operates to connect the common port selectively to the vent port or to the pressure port.

A master power valve 131 has the same construction as valve 124 with a similar handle, shaft, and cam arrangement 132. The valve includes a common port 133, a vent port 134, and a pressure port 135. The master power valve 131 selectively interconnects the common port to the vent port or to the pressure port.

An automatic shutdown valve 136 is also mounted to the control panel and has a handle, shaft, and cam arrangement 137, the same as valve 124. The automatic shutdown valve has a common port 138, a vent port 139, and a pressure port 140.

Similarly, an automatic cycling disengage valve 141 has a handle, shaft, and cam arrangement 142, the same as selector valve 124. This valve is shown in its unactuated position. Disengage valve 141 has a common port 143, a vent port 144, and a pressure port 145.

Air for powering the pneumatic components of this invention is supplied from a pump 150, which may form part of a shop air supply system, the air passing through a filter and water trap 151 and entering a supply line 152. Air from supply line 152 is provided to a first regulator 153 which regulates its output to about 30 p.s.i. A gauge 154 is connected in a line 155 which receives air from regulator 153. Pilot pressure line 155 is connected to the pressure ports of each of valves 124, 131, 136, and 141 for piloting the operation of certain elements of the control system.

A second regulator 156 is connected to supply line 152 between the filter and water trap 151 and first regulator 153. Second regulator 156 will be set to deliver air at approximately 80 p.s.i. Output air from the second regulator is for actuating certain hydraulic control devices, as opposed to signal operations, the higher pressure being provided in order to deliver the greater forces needed for actuation purposes than for signal operation.

The output from regulator 156 goes to a control air supply line 157, there being a gauge 158 in that line. Line 157 connects to a pressure port 159 in a master power relay valve 160. Valve 160 also has a common port 161 and a vent port 162.

A control air line 163 extends from common port 161 to connect to pressure ports of valves in a reversing unit 164. Reversing unit 164 utilizes four snap-action valves 165, 166, 167, 168, which have the flow characteristics explained in connection with FIGS. 5 and 6. The subscript "S" is placed adjacent to the actuating section of each of valves 165–168 to indicate that the valves do not hunt between one position and the other, but when there is sufficient actuating power to accomplish it (a pressure above some critical level), it will snap to its actuated position, and when the pressure falls below the critical level, will snap back to the unactuated position. These valves never occupy an intermediate position.

Line 163 connects to pressure ports 169–172 of valves 165–168, respectively. Each of these valves has a vent port 173, 174, 175 and 176, and a common port 177, 178, 179, 180, respectively. It will subsequently be seen that valve 165 controls movement of a machine longitudinally to the left (minus X movement), valve 166 longitudinal movement to the right (plus X movement), valve 167 inward cross-feed movement (positive Y movement) and valve 168 outward cross-feed movement (minus Y axis movement).

Valves 165–168 each possesses actuating mechanism shown schematically by numerals 181, 182, 183, and 184. Conduits 185, 186, 187, 188 connect with actuating mechanisms 181–184, respectively. Signal conduits 189, 190, 191 and 192 respectively connect with conduits 185, 186, 187 and 188 at terminals 193, 194, 195 and 196. Check valves 197, 198, 199 and 200 are connected in signal conduits 189–192, and permit the passage of fluid away from the respective terminals toward trip devices 201, 202, 203 and 204.

Orifices 205, 206, 207 and 208 are connected in conduits 209, 210, 211 and 212, which are in turn connected to terminals 193, 194, 195 and 196. Conduits 209–212 connect respectively to common ports 213, 214, 215 and 216 of selector valves 103, 102, 94 and 93. Valves 93, 94, 102 and 103 also have charging ports 217, 218, 219, 220 and vent ports 221, 222, 223 and 224, respectively.

Charging ports 217, 218, 219 and 220 are all connected to an off-on signal line 225, as is the common port 133 of master power valve 131. The off-on signal line 225 connects to a terminal 226 which interconnects a first port 227 of a two-position valve 228 and a first port 229 of a snap-acting valve 230. The common port 231 of valve 228 is connected by conduit 232 to the actuator 233 of master power relay 160. The second port 234 of valve 228 is connected by a conduit 235 to the common port 236 of snap-acting valve 230. Valve 230 also has a vent port 237. Valve 230 is a snap-acting valve in the same sense as valves 165–168 in that it does not hunt for a position, but assumes one position or the other when actuator pressure is on one side or the other of a critical level. Valves 228 and 230 comprise the control elements of an automatic shutdown circuit. Actuator 238 of valve 228 is connected via auto-shutdown signal conduit 239 to common port 138 of automatic shutdown valve 136. A valve 240 of the same type as valve 228 has a common port 241 which is connected by a conduit 242 to the actuator 243 of snap-acting valve 230. Valve 240 also forms a part of the automatic shutdown circuit.

A pick lockout valve 250 includes a common port 251, a vent port 252 and a third port 253. A conduit 254 connects common port 251 with actuator 254a on feed rate valve 106. Conduit 255 interconnects third port 253 of the pick lockout valve with a shuttle valve 256. Shuttle valve 256 has a common port 257 (to which conduit 255 is connected) and two other ports 258, 259. In accordance with well-known shuttle valve action, this valve acts to connect common port 257 with one or the other, but never both simultaneously, of ports 258 and 259.

Pick lockout valve 250 includes an actuator 260 which is connected to a selector line 261. There are also connected to line 261 actuators 262 and 263 which serve respectively to actuate a conventional feed pilot valve 264 and an automatic feed pilot valve 265.

Valve 264 has a common port 266, a vent port 267 and a third port 268. Third port 268 is connected to air line 163. Valve 265 has a common port 269, a vent port 270 and a third port 271. Third port 271 is also connected to control air line 163. Common port 266 of valve 264 is connected to a control conduit 272. Common port 269 of valve 265 is connected to a control conduit 273.

A pressure switch 274 is connected to control air line 163 and serves to cut off electric power to the entire machine tool if pressure in control air line 163 falls below the level necessary to exert positive control over the control circuit.

Port 128 of selector valve 124 is connected by conduit 275 to actuators 276, 277, 278, 279 and 280 of valves 281, 282, 240, 283 and 284, respectively. Valves 281 and 282 act as selector valves for the automatic actuators 96, 97, 104 and 105. Valves 281 and 282 respectively have common ports 285, 286 and first ports 287, 288 and second ports 289, 290. Common port 285 of valve 281 is connected by a conduit 291 to port 258 of shuttle 256, and also to the common port 292 of a timer valve 293.

Common port 286 of valve 282 is connected by conduit 294 to port 259 of shuttle valve 256 and also to a third port 295 of timer valve 293. Valve 293 has a vent port 296.

Actuator 297 of timer valve 293 is connected to a terminal 298. Conduit 294 is connected to a terminal 299. A one-way check valve 300 is connected between terminals 298 and 299 permitting flow of air from terminal 299 to terminal 298, but not the reverse. Terminal 298, and therefore actuator 297, of the timer valve are connected via conduit 301 to terminal 122 of pick timer valve 121. Conduit 301, and conduit 302 which is connected to terminal 122 of the pick timer valve and to terminal 299 together enclose a volume of space which is to be charged and discharged with air (shown schematically as "vol" in conduit 301). Conduits 301 and 302 are sometimes collectively called the "timer line."

Direction control actuator relays 303, 304 are shown in FIG. 1. Relay 303 comprises a pair of actuators 305, 306 which operate on opposite sides of a selector valve 307. The notation "D" next to relays 303 and 304 identifies these relays as detent-type relays; that is to say, the selector valve itself will retain the position at which it was last set until that position is changed by actuation of the actuator which did not establish said last position. Selector valve 307 has a common port 308 and a first and second port 309, 310 respectively.

Relay 304 has actuators 311, 312 which act upon a selector valve 313 that has a common port 314 and first and second ports 315, 316, respectively. Actuators 305 and 306 are respectively connected to opposite ports 317, 318 of a shuttle valve 319. The common port 320 of the shuttle valve is connected to a conduit 321. Actuator 305 is further connected to conduit 322, while actuator 306 is further connected to conduit 323.

Similarly, actuators 311 and 312 are connected to ports 324 and 325, respectively, of a shuttle valve 326. The common port 327 of the shuttle valve is connected to a conduit 328. Actuator 311 is also connected to a conduit 329, while actuator 312 is also connected to a conduit 330. First and second ports 309 and 310 of selector valve 307 are connected to power conduits 331, 332 which are respectively connected to actuators 97 and 96 for determining the position of the cross-feed control handle.

Similarly, first and second ports 315 and 316 of selector valve 313 are connected to power conduits 333 and 334, which are respectively connected to actuators 104 and 105 for adjusting the position of the longitudinal feed control handle.

The above mechanism and circuits are all provided to determine which way the cross-feed is to move, that is, in or out; which way the longitudinal feed is to move, that is, right or left; and which of the cross-feed or the longitudinal feed is to be operated as a pick movement, and the other as a feed movement. Furthermore, it is the purpose of the above circuitry to determine whether the operation is to be automatic or if it is to be conventionally controlled, that is, by manually sequenced operations.

To this point, the various pneumatic connections have been discussed and it is now appropriate to discuss the units which will themselves control the flow of hydraulic fluid to the appropriate side of the appropriate fluid motors for powering the movement of the machine's table. The basic elements for carrying out the switching of hydraulic fluid are two blocks of valves bracketed in the drawings and labelled "directional control unit" and "circuit selector unit." Before entering into a detailed discussion of the individual valves and their operation, the basic theory of operation of certain of these valves will be discussed. Consider selector valves 335, 336, 337, 338 in the direction control unit. It will be observed that the actuators for valves 335 and 338 are both connected to conduit 330, and that the actuator for selector valves 336 an 337 are connected to conduit 329. As it happens, one of these signal conduits will be under pressure while the other is vented. Therefore, the valves will be actuated in pairs; that is, valves 335 and 338 will be actuated while valves 336 and 337 are not, or valves 336 and 337 will be actuated while valves 335 and 338 are not. The result is that the bank of selector valves 335–338 acts as a four-way valve which will determine in the case of those valves whether hydraulic pressure provided to the X axis motor makes the motor run to the right or to the left.

In the circuit selector unit there are selector valves 339, 340 and 341. Valve 339 will, when actuated, direct the exhaust from the X axis motor operation to conduit 46 and through the upper sector 39 of the tracer valve, so that the rate of motor operation will be modulated by the tracer valve (when X axis movement is "feed movement" and valve 339 is actuated).

Selector valve 340 will, if actuated, direct the exhaust in such a manner as to bypass the tracer valve and enable the machine tool to be operated as a conventional milling machine.

Selector valve 341 will, then actuated, run the exhaust from X axis motor through circuits which will limit its operation to pick feed movement.

Therefore, selector valves 339, 340 and 341 may conveniently be designated feed control valve, conventional control valve and pick movement control valve, respectively.

There is a second similar bank of selector valves 342, 343, 344 and 345 which operate to control the Y axis motor. These correspond in their actions to selector valves 335–338, and in the circuit selector unit there are selector valves 346, 347 and 348 which correspond to selector valves 339–341. Therefore, it will be seen that provision is made for determining which way the table will move in each of the X and Y axes and what kind of movement will be attained when pressure is on the motor to move it in that direction.

Valves 335–338 and 342–345 form two sets of off-on valves comprising direction control means. The left-hand ports of each of these valves as shown in FIG. 2 are sometimes referred to as "first" ports, and the right-hand ports as "second" ports.

Valves 339–341 and 346–348 form two sets of off-on valves comprising circuit selector means. The left-hand ports of each of these valves as shown in FIG. 1 are sometimes referred to as "first" ports, and the right-hand ports as "second" ports.

Valve sets 335–338 and 339–341 are respective sets, relating to the operation of motor 11. Valve sets 342–345 and 346–348 are respective sets, relating to the operation of motor 12.

Second ports 374a and 389 are connected to a means (via conduit 46), sector 39 of the tracer valve, for governing flow in one manner (a flow rate to one motor synchronized with the rate to another motor). Second ports 375a, 376a, 390, and 391 of valves 340, 341, 347 and 348 are connected to a means (via conduit 376b), feed rate valve 106, for governing flow in another manner (for conventional milling).

The term "off-on" as used in connection with valves in the specification and claims, is synonymous to "closed" and "open" to fluid flow between ports of the respective valves.

The terms "bank" and "set" have been used interchangeably herein, and are synonymous.

Now to a more detailed description of the operation of the circuit. Conduits 329, 330, 323 and 322 are respectively connected to common ports 177, 178, 179 and 180 of snap-action valves 165–168. It is the compressed air passed from the control air line 163 by these four valves 165–168 which determines the setting of the members of the direction control unit and also determines the adjustment of actuators 93, 94, 102 and 103. The condition of the valves in the circuit selector unit is determined by valves 283 and 284 of which more will be said below. Conduit 329 controls movement of the X axis motor to the left relative to the coordinate scheme, and is connected to actuators 353 and 354 of selector valves 336 and 337, respectively.

Air in conduit 330 controls movement of the X axis motor to the right relative to the coordinate system and is connected to actuators 355 and 356 of selector valves 335 and 338, respectively.

Conduit 323 connects with actuators 357 and 358 on selector valves 343 and 344, respectively. Air from conduit 323 controls the movement of the cross-slide inwardly, that is, on the plus Y direction on the coordinate system.

Conduit 322 is connected to actuators 359 and 360 on selector valves 342 and 345, respectively. Air in conduit 322 controls outward movement out of the cross-slide, that is, minus Y movement in the coordinate system.

Hydraulic pressure from feed supply conduit 55 is provided to pressure ports 361 and 362 of selector valves 335 and 336, respectively. Pressure is also provided to pressure ports 363 and 364 of valves 342 and 343. This is the source of fluid pressure for actuating both the X and Y movements of the table, and it is the function of the valves in the direction control unit to select which direction the motor is to be moved. It is the function of the valves in the circuit selector unit to determine the manner in which the pressurized fluid thus supplied is permitted to actuate the motors.

Outlet port 365 of valve 335 is connected to conduit 366, which is connected to the side of X axis motor which will cause the motor to move the table to the right, that is to say, plus X axis movement. Conduit 366 is also connected to a first port 367 of valve 337. Outlet port 368 of valve 336 is connected to conduit 369, which conduit is connected to that side of the X axis motor which will cause the table to move in the minus X direction along the coordinate. Conduit 369 is also connected to a first port 370 of valve 338. Second ports 371, 372 of valves 337 and 338, respectively, are both connected to a manifold 373 to which the first ports 374, 375 and 376 of valves 339, 340 and 341 are connected. The second port 374a of valve 339 is connected to inlet conduit 46 of the tracer valve. Second ports 375a and 376a of valves 340 and 341 are both connected to exhaust line 376b.

The circuit selector valves will determine that the exhaust from either the crossfeed or the longitudinal feed will be selected to pass through inlet conduit 41 to the tracer valve and control feed movement, while the other will be caused to flow to valve 106 and control pick movement.

Outlet port 377 of valve 342 is connected to conduit 378, which conduit is connected to the side of the Y axis motor which will cause the crossfeed to move in the minus Y direction. Conduit 378 is also connected to a first port 379 of valve 344.

Outlet port 380 of valve 343 is connected to conduit 381. Conduit 381 is connected to that side of the crossfeed Y axis motor which will cause the motor to move the table in the plus Y direction. Conduit 381 is also connected to a first port 382 of valve 345.

Second ports 383 and 384 of valves 344 and 345, respectively, are both connected to a manifold 385, which manifold is connected to the first ports 386, 387, 388 of selector valves 346, 347 and 348, respectively. Second port 389 of valve 346 is connected to inlet conduit 46. Second port 390 of valve 347 and second port 391 of valve 348 are both connected to exhaust line 376b.

Pilot selector valves 283 and 284 (FIG. 2) have common ports 392, 393, vent ports 394, 395 and pressure ports 396, 397, respectively. The pressure ports of both valves 283 and 284 are connected to conduit 273. The common port 392 of valve 283 is connected to line 400 and the common port 393 of valve 284 is connected to line 401.

Actuators 402 and 403 are connnected to line 272. Actuators 404 and 407 are connected to line 401. Actuators 405 and 406 are connected to line 400.

Trip device 201 is shown in detail in FIG. 1, it being understood that trip devices 202, 203 and 204 are similar. Trip device 201 includes a valve body 420 having a ball seat 421 and a ball 422 therein. The ball when seated shuts off flow between conduit 189 and a passage 423 in the valve body. The ball can be unseated by contact with a dog 424. The dog is attached to a relatively immovable portion of the machine tool along the axis concerned, and the ball is unseated by the dog when the worktable moves to the end of its stroke.

With respect to trip device 201 it is desired to make contact and reverse the movement of the machine when the table has moved as far as desired longitudinally to the left, that is, at the conclusion of minus X movement. As will be seen below, contact of the dog with the ball will dump the air from conduit 189 and this will reverse the machine.

The dog in trip device 202 will cause stoppage of movement to the right (plus X). Contact with the dog in device 203 will stop movement in the plus Y direction. Contact with the dog in trip device 204 will stop movement in the minus Y direction.

Common port 314 of valve 315 is connected by conduit 430 to port 289 of valve 281. Port 308 of valve 307 is connected by conduit 431 to port 287 of valve 281. A first port 432 and a second port 433 of valve 240 are respectively connected to conduits 321 and 328.

The physical construction of valve 335 which is exemplary of all the valves in the direction control unit and the circuit selector unit, is shown in FIG. 10. Valve 335 has a hydraulic sector 435 and an actuator sector 355. The hydraulic sector has a body 436 in which ports 361 and 365 are formed. These ports intersect a bore 437. Bore 437 is closed by a plug 438. Within the plug, there is a poppet 439, which poppet has a reduced section 440. At the end of the reduced section there is attached a seat member 440a which is adapted to contact a seat 441 in the bore so as to control flow between ports 361 and 365.

The valve is shown in an unactuated closed condition with the seat member 440a against seat 441, and with pressure off in the signal port 442 of the actuator. At the right-hand end of the poppet there is a backing member 443 which is abutted by a diaphragm 444, the diaphragm being attached between the body and a cap member 445. A signal chamber 446 is formed inside the cap and closed by the diaphragm. A bias spring 447 biases the poppet to the valve-closed position.

It will be seen that with pressure off in signal chamber 446 the bias spring will tend to cause the seat member to close the hydraulic sector of the valve. When the valve is actuated by placing pressure in chamber 446 the poppet is moved to the left and passage is open between the ports 361 and 365. This is the physical embodiment indicated by the notation of valve 335 in FIG. 1.

This completes the description of the mechanical elements of the control system and the machine tool which it directs. A description of the operation of the mechanism will now be given.

*Operation*

Air is turned on at pump 150 which through regulators 153 and 156 provide air to supply lines 155 and 157. In the drawings (see FIG. 2), master power valve 131 is shown turned off. In this condition of the valve, common port 133 is connected to vent 134 and this vents signal line 225 to atmospheric pressure. This means that there is no actuating pressure provided from signal line 225 to any of selector valves 93, 94, 102 or 103, and therefore no pressure can be supplied regardless of the position of the crossfeed and longitudinal feed handles to the directional pilot unit (valves 165–168). Also, no pressure is provided to terminal 226, leaving the automatic shutdown circuit unpowered. The device is entirely shut down.

To start up the device, the master power is turned on by rotating shaft 132 so that a connection is made between supply line 155 through pressure port 135 to common port 133, and pressure is on in signal conduit 225. This means that actuating pressure is available through the crossfeed and longitudinal feed controls 90 and 101, depending on their settings, and also that pressure is applied to terminal 226. The machine can now be made to operate.

A single example of machine tool movement will be given of automatic operation with the feed movement on the longitudinal axis to the left (minus X movement) and pick movement on the crossfeed (Y axis) outward, that is, minus Y movement.

In order to secure this arrangement, the automatic cycling disengage valve 141 will be placed on automatic (the drawings show it in manual position). Fluid under pressure then will flow from supply line 155 through pressure port 145 to common port 143 of valve 141 to line 261, thereby applying actuating pressure to actuators 260, 262 and 263. The conditions of valves 250, 264 and 265 will be the reverse from those shown, because in the drawings they are illustrated unactuated for manual machine control.

The selector valve 124 is left in the position illustrated. This connects common port 128 to vent 129 and vents conduit 275 which leaves deactuated the following actuators: 276, 277, 278, 279, 280. The valves controlled by these actuators, that is, valves 281, 282, 240, 283 and 284, respectively, all remain in the condition shown in the drawings. The solid arrows show the valve condition corresponding to the illustrated actuator condition. The dotted arrows show the valve condition for the alternate actuator condition.

It will be appreciated that had it been desired to have feed movement on the crossfeed axis and pick movement along the longitudinal axis, reversal of the position of selector 124 would have put the same actuators under a pressure so that the condition of every one of the valves would have been reversed. Thus valves 281, 282, 240, 283 and 284 form a selector bank which determines which axis is to have the feed movement and which is to have the pick movement.

To start the machine in the selected direction, the crossfeed control valve 90 will be turned so as to actuate valve 93 (changing the position of its blocks) and to leave valve 94 the way it is. The valve in the drawings is shown in the neutral position with neither valve actuated. This applies pressure from signal line 225 through port 217 to common port 216 of valve 93 and through orifice 208 into conduit 212. Pressure at terminal 196 actuates actuator 184 and also flows through check valve 200 where the conduit 192 between terminal 196 and trip device 204 is charged up to signal line pressure.

Actuation of valve 168 connects line 163 to common port 180 of valve 168 and thereby supplies pressure to conduit 322, which actuates actuators 359 and 360 of valves 342 and 345, respectively. This closes fluid communication between terminals 363 and 377 of valve 342 and terminals 382 and 384 of valve 345. Hydraulic pressure from feed supply conduit 55 is thereby passed by valve 342 to conduit 378. Conduit 378 crosses from FIG. 1 to FIG. 2 and flows to the left-hand side of Y axis motor 12. Exhaust fluid from motor 12 returns through conduit 381, which in the drawings returns to FIG. 1, and conduit 381 is connected into terminal 382 of valve 345 which is actuated along with valve 342. Returned fluid can therefore flow from terminal 382 to 384 and into manifold 385. The disposition of the exhaust fluid in manifold 385 will be described in a moment when the control on the X axis has been fully disclosed.

The feed movement will, because of the setting of valves 307 and 303 start out in the direction opposite from the last feed movement. Or, if this direction is the wrong way for the example, the longitudinal feed valve is manually turned to the right, thereby actuating valve 103 and leaving valve 102 in the unactuated condition illustrated. Actuation of valve 103 causes fluid from line 225 to reach common port 213, from which it flows through orifice 205 in conduit 209 to terminal 193. This pressure flows through check valve 197 and charges conduit 189 between terminal 193 and trip device 201. Pressure in conduit 185 actuates actuator 181 and pressure from line 163 is then supplied from port 169 to common port 177 of valve 165 to conduit 329.

Pressure in conduit 329 actuates actuators 353 and 354 of valves 336 and 337. Accordingly, pressure from supply line 55 is passed by valve 336 between ports 362 and 368 from which it flows to conduit 369. Conduit 369 passes (see FIG. 2) to the righthand side of X axis motor 11. Exhaust fluid from motor 11 returns to inlet port 367 of valve 337 which is also actuated. This fluid is therefore passed through valve 337 to manifold 373.

It will now be seen that the exhaust from both the X and Y axis motors has been passed by the direction control unit to conduits 373 and 385. Inasmuch as the motors are hydraulic fluid motors, their rates of operation can be completely controlled by operation of downstream valving which exerts control over the flow of such exhaust fluid. In accordance with common hydraulic practice, the motors are operated under full pressure, with the control exerted on the exhaust side.

Manifolds 373 and 385 always hold the exhaust fluid, and what happens to this fluid determines the method of operation of the motors themselves.

At this point, the alternate operations of the crossfeed and the longitudinal feed control handles 90 and 101 may conveniently be explained. The above example has been given with respect to crossfeed out and longitudinal feed to the left. It will be understood that there are four combinations available, that is, any combination of right and left and in and out movement. Should movement in have been desired along plus Y axis, shaft 91 would have been turned so as to deactuate valve 93 and to actuate valve 94, in which case actuator 184 would have been deactuated and actuator 183 would have been actuated, thereby putting pressure on conduit 323 and actuating actuators 357 and 358, leaving actuators 359 and 360 deactuated. This would have passed hydraulic fluid between terminals 364 and 380 of valve 343 to conduit 381. Conduit 381 would move the table on the plus Y axis and fluid would have returned from Y axis motor through conduit 378 to port 379 of actuated valve 344, passing to port 383 of the same valve and to manifold 385.

Similarly, had longitudinal movement to the right been desired, valve 102 would have been actuated by turning handle 101, thereby leaving valve 103 deactuated. Deactuating valve 103 leaves actuator 181 deactuated, while actuating valve 102 provides pressure to actuate actuator 182 of valve 166. Valve 166 thereby supplies pressure to conduit 330, which actuates valves 335 and 338. Then valve 335 passes fluid between ports 361 and 365 to conduit 366. Conduit 366 operates X axis motor 11 to the right and fluid returns through conduit 369 to port 370 of valve 338 which is actuated. This passes the returned fluid to manifold 373. It will therefore be seen that the direction control unit acts as a selector means to determine whether the X and Y motors move the worktable to the right or left, and in every case the respective exhaust fluids are provided to manifolds 373 and 385.

In the example under discussion, the longitudinal (X axis) movement is to be feed movement, and the crossfeed (Y axis) movement is to be pick movement. This arrangement was provided for when the selector 124 actuated actuator 279 of valve 283, for then fluid from supply line 157 will have passed through actuated valve 160 to line 163 and through actuated valve 265 to conduit 273 and thence through unactuated valve 283 to conduit 400. Conduit 400 (see FIG. 1) actuates actuator 406 of valve 339 and actuator 405 of valve 348.

When valve 339 is actuated, then fluid from manifold 373 is passed between ports 374 and 374a to conduit 46. Conduit 46 passes through section 39 of tracer valve 17. It is sector 39 which regulates the feed movement of a motor controlled by it. Fluid exhausted from sector 39 flows out conduit 47 to reservoir. It will be seen that this adjustment therefore establishes the X axis movement as "feed movement." It will be observed that valves 340 and 341 are not actuated. The appropriate conduits controlling them at this time are conduits 401 and 272. Conduit 401 is vented by unactuated valve 284, and conduit 272 is vented by actuated valve 264.

With actuator 405 of valve 348 actuated, fluid from manifold 385 flows from port 388 to port 391 and into exhaust conduit 376b. Conduit 376b discharges into the feed rate valve 106 and out of that valve to reservoir. The construction of valve 106 has been discussed above, and it will be appreciated that the rate at which the fluid can flow through Y axis motor is governed by valve 106. Flow out of valve 106 is controlled by actuator 254a. It will be seen that actuator 254a controls valve 254b, which, when the actuator is unactuated, permits the flow of fluid through valve 106. Therefore, the prerequisite of pick movement is that actuator 254a be unactuated. This will be discussed in greater detail below.

Had it been desired to reverse the above situation and have the Y axis move as feed movement and the X axis as pick movement, selector 124 would have been reversed, thereby reversing the condition of valves 281, 282, 240, 283 and 284. In particular, this would have reversed the condition of valves 283 and 284 which are the selector valves which pertain to this problem in this case. Had reversal occurred, then actuators 405 and 406 would have been unactuated because of no pressure in conduit 401, and actuators 404 and 407 would have been actuated, thereby passing fluid from manifold 385 to conduit 46 placing the Y axis under feed control movement and discharging manifold 373 through valve 341 to conduit 376b and the feed rate valve 106. This is, of course, a reversal of the position being discussed in detail.

Also, it may be pointed out that it might not be desired to have either axis under feed or pick movement, but instead to utilize the circuit as a conventional mill. Then actuators 402 and 403 must be actuated. It will be observed that these are both connected to conduit 272, and that conduit 272 will be under pressure when actuator 262 of valve 264 is unactuated. Actuator 262 is unactuated when selector 141 is positioned as shown in the drawings, with conduit 261 vented. This vents actuators 260, 262 and 263. All power will have been cut off to valves 283 and 284 because valve 265 is vented to its vent 270. There can then be no pressure in conduits 400 and 401, and valves 339, 341, 346 and 348 are closed. Therefore, with pressure on in conduit 272, valves 340 and 347 are open to flow, and fluid from both manifolds 373 and 385 is dumped into exhaust conduit 376b. This exhaust conduit dumps through the feed rate control valve 106 which may be opened as wide as desired, and fluid from there flows directly to exhaust. At the same time, actuator 254a remains unactuated because actuator 260 is vented at valve 141, so that fluid can flow through valve 106. This describes the conventional powered movement of the device. The direction of movement is selected by valves 90 and 101.

To this point it has been described how the direction control unit and the circuit selector unit determine the direction the worktable is to move, and the manner of movement along each of the axes. The automatic features of this circuit will now be more fully discussed. Returning to the initial example of X axis feed movement to the left and pick movement outward, it will now be seen that there is pressure in conduits 329 and 322.

The operation of valves 303 and 304 will now be described. These valves are of the "flip-flop" type. They are pre-positioned at each reversal to transmit power to actuators 96, 97, 104 or 105 for the next reversal. For example, when pressure is on in actuator 305 (of valve 307), connection will be made as indicated by arrow 500 (the lower arrow), and when actuator 306 is actuated, the connection is made as shown by upper arrow 501. The same is true of actuators 311 and 312, which when actuated, cause the connection to be made as shown by lower and upper arrows, 502, 503, respectively. Valves 307 and 313 are detent types, and retain their last setting until it is changed. They transfer from one setting to the other at about 50-60 p.s.i., a pressure higher than the transfer pressure of actuator 297 in valve 230, for reasons to be disclosed.

It will first be assumed that the carriage is moving to the left, and that it is to be automatically reversed at the end of a feed movement stroke to move to the right.

Pressure is on in conduit 329, actuator 311 has transferred the connection in valve 313 to the condition illustrated by arrow 502, and pressure is transmitted through shuttle 326 to conduit 328. Valve 103 is actuated; valve 102 is unactuated. Under these conditions, the machine will run to the left until trip device 201 is struck. Then the machine is to reverse and run to the right, after having taken one pick feed step.

For this purpose, actuator 105 will have to be actuated to strike the handle of valve 101 so as to actuate selector valve 102 and deactuate valve 103. Air can flow to actuator 105 from conduit 430 via the connection illustrated by arrow 502, the valve condition assumed when the table started to move to the left on the last reversal.

Pressure in conduit 430 occurs when actuator 276 (see FIG. 2) of valve 281 is unactuated as a result of selector 124 having been set at longitudinal feed condition, that is, by venting the same, and this condition must be concurrent with an unactuated condition of actuator 297 of valve 293. The unactuated condition of actuator 297 will result when the timer line comprising conduits 301 and 302 is discharged.

Power to valve 293, which is ultimately transmitted to conduit 430 is brought from conduit 273, which conduit 273 receives power from supply line 163 when valve 265 is actuated by setting valve 141 on the automatic position. It will therefore be noted that pressure will arrive at valve 304 to be transmitted to actuator 105 only when the timer line comprising conduits 301 and 302 is discharged. It must now be determined how this timer line becomes discharged.

It will be observed that the timer line conduits terminate at terminals 298 and 299, and that because check valve 300 is placed between these two terminals, the only exit of air from the timer line is through conduit 294. Conduit 294 is connected by valve 282 to conduit 328 when actuator 277 is unactuated as shown. Conduit 328 (see FIG. 1) passes to port 327 of shuttle 326 and is under pressure by virtue of its connection through that shuttle valve with conduit 329 which is under pressure when the machine moves to the right. Conduit 329 in turn, is under pressure because actuator 181 of valve 165 is energized by virtue of actuation of valve 103. This actuation has resulted in the charging up of conduit 189 with air, and this air is held because trip device 201 is closed. As soon as the machine has gone as far as desired to the left, the dog of trip device 201 unseats the ball of the device, and permits air to escape from conduit 189 faster than orifice 205 will permit it to be restored. This leakage permits the air to discharge from actuator 181 and the valve 165 becomes de-energized, thereby venting conduit 329, which in turn vents conduit 328, which in turn through valve 282 vents conduit 294 and the timer line. This drop in the pressure in the timer line then enables the actuator 297 of valve 293 to become deactuated which passes pressure from conduit 273 to conduit 291. This in turn provides fluid to conduit 430 which provides a flow to port 314 of valve 304. Then, fluid from port 314 flows through conduit 334 and enters actuator 105 which knocks the handle of valve 101 to the left so as to deactuate selector valve 103 and actuate valve 102. This action causes valve 103 to vent conduits 185 and 189, and this removes the pressure from conduit 329.

The said action also cuts off the source of air from conduit 273 as soon as timer valve 293 reactuates. Actuators 96, 97, 104 and 105 have within them a small bleed orifice which provides means for venting the air which was supplied to actuate the actuator after the selector position has been changed. It will be understood that other means of venting the actuators could comprise a valving means in the "flip-flop" arrangement whereby the air would be vented from these actuators when the "flip-flop" valve switched over. The natural leakage in an actuator having rather loose tolerances would also allow this leakage. However it occurs, actuators 96, 97, 104 and 105 are bled down after they have applied their momentary burst of power to flip the handles of selectors 90 or 101 to the next position.

This momentary power exerted by the actuators is a preferred feature of the invention because it leaves the extended handles free to be moved by the operator at any time for the purpose of reversing the direction of feed at will, without reference to the machine stops, which might be incorrectly set. Also, it permits the operator to locally mill detailed areas without setting the stops at all. He may perform these operations, still retaining the automatic pick movement action by placing the handle in neutral when he desires to stop his longitudinal feed. This has the same effect as tripping the appropriate trip mechanisms 201–204, as it removes air from the respective actuator.

Attention in this respect is called to check valves 197–200. It will be observed that in order for actuators 181–184 to become deactuated, that the air in the respective conduits 185–188 and 209–212 must be discharged. The volume of these conduits may be kept relatively small, while the conduits 189–192 which are connected thereto must run all the way out to the trip devices and may comprise a significantly large volume. If the pressure in lines 189–192 had to be discharged during the reversal operation, then a sloppy movement might well result. For this reason, the check valves 197–200 are provided which prevent reverse flow from conduits 189–192, thereby limiting the volume from which pressure must be discharged to that contained in conduits 185–188 and 209–212.

At this point, attention may also be called to another usefulness of valve 106. When the device is utilized manually, it may be desired to shift the machine rapidly so as to provide a quick traverse movement. For this purpose, it is only necessary to select the direction in which traverse is desired, and then to open valve 106 wide by pressing on handle 108 to permit the maximum rate of fluid flow therethrough.

The next thing that occurs is that when valve 102 is actuated by the handle, pressure is provided to conduits 186 and 190, thereby actuating actuator 182. This places pressure in conduit 330 which actuates valves 335 and 356, which as stated above, starts the carriage moving to the right. At the same time, pressure is supplied by conduit 330 to actuator 312 of valve 304 which reverses the position of the valve to that shown by arrow 503, and air is also supplied to port 325 of shuttle 326, this air flowing through conduit 328 (see FIG. 2), which pressure flowing through valve 282 charges up the timer line by applying pressure at terminals 298 and 299. This pressure actuates actuator 297 and cuts off valve 293, thereby cutting off pressure flow to valve 281, which in turn cuts off flow to the actuators until the pressure drops in the timer lines again. When this occurs, it will be because trip device 202 has been opened to discharge conduits 186 and 190, thereby deactuating actuator 182 and providing a vent to atmosphere through vent 174 which discharges conduit 330 and through this vent discharges the timer line. At the same time this will deactuate actuator 297 of valve 293, and then fluid under pressure is directed to conduit 430 which provides pressure at port 314. Pressure from port 314 is transmitted by the last setting of valve 304 to actuator 104 which kicks over the handle of valve 101 to reverse the same and cause the device to move to the left as before. It will be seen that this is an automatic reversal of the longitudinal axis movement which occurs by virtue of discharging the timer line out the vents 170 and 174 of valves 165 and 166, respectively. The same sort of action would occur were feed movement to be desired along the crossfeed, because then the "flip-flop" switch 303 would receive pressure from conduit 431 the same as conduit 430 received it because actuator 276 would be actuated by changing the selector position to crossfeed, and therefore pressure from conduit 291 would be fed to port 287 of valve 281 so that the "flip-flop" valve 303 would receive pressure from conduit 291 instead of valve 304.

The above accounts for feed movement along either of the axes. The pick movement will now be described.

It will be noted that in the above description of reversing movement, only one pair of trip devices, on the same axis, were involved. This is because pick movement occurs only in one direction, stepwise, and is not a reversing movement. It will be recognized that pick movement should occur only when longitudinal movement has stopped at the end of its stroke and that it is preferable for longitudinal movement to be entirely stopped when the pick movement occurs. Whichever axis is on pick movement, exhaust pressure is provided through conduit 376*b* to valve 106 (see FIG. 2). Actuator 254*a* will be maintained under pressure while actuator 260 is energized by the automatic setting of selector 141, and whenever there is pressure in either of conduits 291 or 294, the conditions being concurrent. Conduit 294 will be pressurized whenever there is pressure on in any of conduits 322, 323, 329 and 330, because conduits 322 and 323 feed into conduit 321 through shuttle 319, while conduits 329 and 330 feed into conduit 328 through shuttle 326. Then pressure is passed by selector 282 to conduit 294, and there will therefore be pressure passed through shuttle 256 into conduit 255 and thereby to actuator 254*a*. Therefore, whenever there is pressure on in any of the four conduits 322, 323, 329 and 330 which at the setting of the valves is causing feed movement to occur, actuator 254*a* is actuated and fluid cannot flow through valve 106. Valve 282 "locks out" pick movement pressure from the timer line and thereby from actuator 254*a*. It will also be observed that conduit 255 can receive pressure from conduit 291, which occurs whenever actuator 297 is unactuated as shown, and that this occurs at the end of the stroke when the timer line is discharged.

At first glance, it might appear that this takes in the entire cycle, and that conduits 254 and 255 could not ever become discharged. However, there is a design feature herein which permits these to discharge at an appropriate moment. It is as follows: the snap-action valve 293 transfers at about a pressure of 10 to 15 p.s.i. on actuator 297, as does actuator 254*a*. In order for actuator 297 in valve 293 to become deactuated, fluid must discharge from the comparatively large volume in conduits 301 and 302 entirely through conduit 294. This takes an appreciable period of time, because check valve 300 requires the flow to be from terminal 298 through conduits 301 and 302 to terminal 299 in that order. Until pressure falls to this level, pressure will be off in conduit 291, because actuator 297 was actuated. Pressure will continue to drop at terminal 299 as air flows out of conduit 294, and therefore it also falls in conduits 254 and 255. Finally the transfer pressure (10–15 p.s.i.) of actuator 254*a* is reached, and valve 254*b* is opened to flow. This pressure will be reached in conduits 254 and 255 before it is in conduits 301 and 302 (which control actuator 297), because of the greater volume in lines 301 and 302, and because the restriction in valve 121 retards the fall of pressure in conduit 301. Therefore, actuator 254*a* becomes deactuated before actuator 297. Thereafter, actuator 297 becomes deactuated. This connects conduits 291 and 273 through valve 293, and pressure is again supplied to conduits 254 and 255, this time through shuttle 256 from conduit 291. Pick feed is therefore stopped by actuation of actuator 254*a*, which closes valve 254*b*. The time which valve 106 is open for flow is determined by the length of time which it takes for discharge from terminal 299 out conduit 294 to take place before actuator 297 snaps over. The feed rate valve 106 is opened for a predetermined period of time each time that fluid is discharged from conduit 294. The length of this time is adjusted by valve 121, which determines how fast the pressure may exhaust from conduit 301 into conduit 302. The combination of rate control by valve 106 and time control by valve 121 determines the distance stepped for each pick movement. Cutting down either tends to shorten the step.

Which way the pick movement occurs when the pick is on crossfeed is determined by whether the handle 90 is set to the right or to the left. It is frequently desired to have this machine go back and forth and step over incrementally a number of times and then to shut off when the job is completed. It will be understood that a job will be completed as soon as the device has reversed back and forth across the work repeatedly until the pick feed has stepped the table for the full width of the work. Means are therefore provided for automatically shutting down the machine as soon as a trip device on the longitudinal movement and a trip device on the crossfeed movement are simultaneously engaged. Incidentally, when the device is used manually, automatic shut-down occurs when a trip device on the pick movement axis is engaged.

When the automatic shutdown is disengaged as shown in FIG. 2, conduit 239 to selector 228 is vented and actuator 238 is deactuated such that pressure fluid from off-on switch 131 flows to terminal 226 and thence through conduit 232 to actuate the master switch 160. In the event that the device is desired to operate so as to shut down automatically, automatic shutdown switch 136 is turned to its engaged position (it is illustrated in the disengaged position), so pneumatic pressure is applied through conduit 239 to actuator 238. This interconnects ports 231 and 234 in valve 228. Actuator 243 of valve 230 will be actuated so as to transmit power from terminal 236 to conduit 235, through valve 228, and to conduit 232 so as to actuate the off-on valve when there is pressure in conduit 242. This pressure occurs whenever valve 240 is connected through shuttle 319 or 326 to the conduit 322, 323, 329, or 330, which controls pick feed movement. For example, in the example given where pick feed is on the crossfeed movement, there is pressure in conduit 321 because there is pressure in conduit 322. This pressure flows from port 432 to port 241 and so long as the trip device 204 remains undisturbed, pressure will be on in this line because valve 168 is actuated. However, as soon as trip device 204 is opened and valve 168 is closed, then pressure drops in conduits 322 and 321 and this vents conduit 242, thereby deactuating actuator 243 and cutting off pressure to conduit 235. In turn, this de-energizes actuator 233 and cuts off all pneumatic power to the control circuit. This shuts off all control power to move the machine, and through pressure switch 274 cuts off electric power to the machine tool element, such as spindles and the like. It will be observed that this result would have occurred whichever way the crossfeed was moving when the last pick feed took place, and that the same result would have been attained by dumping pressure from conduit 328 had pick feed been on the longitudinal movement and actuator 278 been actuated for that purpose.

It is believed that any combination of machine tool movements within the capacity of this machine may be deduced from the above examples.

Certain features of this invention may now be understood in their full importance. Particular attention is called to the hydraulic supply system, particularly the use of a single pump 49 in combination with two supply lines 51 and 55 in combination with orifice 52. Orifice 52 is provided for the purpose of permitting a different operating pressure to be chosen if desired, for each line under control of the tracer valve. In this manner the feed rates of each valve can be balanced, even though the motors do not require the same pressure for operation, for example, because the force required for moving them might not be balanced. The circuit connected as shown presupposes that the table circuit requires a basically higher pressure for its operation than the knee. By this arrangement, the orifice limits the flow from the circuit of higher pressure to that of the lower pressure according to the pressure difference between these two circuits and the area of the orifice. The sizing of this area provides a base division of the total pump output through the two systems that always provide more capacity to each of the valve circuits than the maximum valve opening can pass. This results in both circuits operating independently and without relation as to pressure required to move either element.

Another important feature of the invention resides in the banks of selector valves 335–338, and 342–345. These banks of four light-weight, inexpensive, pneumatic operated valves perform the same duty as a single, expensive hydraulic four-way valve. The reduction of cost and complexity attained by these valves, as compared with conventional hydraulic valves, is striking.

The device shown in the drawings and described in the description provides a completely automatic machine tool which is capable of being operated either as a conventionally powered milling machine or as a completely automatic contour copying machine, which is so automatic that it may simply be turned on and will turn itself off when the desired work is achieved.

This invention is not to be limited by the embodiments shown in the drawings and described in the description, which are given by way of example and not of limitation, but only in accordance with the scope of the appended claims.

I claim:

1. A control for controlling application of power from a power source for reciprocably moving a machine tool member in both directions along an axis by exerting control over power applied from said power source to a reversible motor engaged to the member, the control selecting the direction the member moves, said control comprising: an exhaust conduit; a first and a second valve each having a pair of ports, a first port of each of said first and second valves adapted to be connected to said power source, the second port of the first valve being connected to the motor for passing power to said motor to operate it in one direction, and the second port of the second valve adapted to be connected to the motor for passing power thereto to operate it in the other direction; a third and fourth off-on valve each having a pair of ports adapted to be connected to the motor, a first port of the third valve adapted to be connected to the motor to operate it in the same direction as the first valve and a first port of the fourth valve being adapted to be connected to the motor for passing power to said motor to operate it in the same direction as the second valve, the second ports of the third and fourth valves adapted to be connected to said exhaust conduit; and direction control means for simultaneously and selectively closing the first and fourth valves against flow between their ports while opening the second and third valves for flow between their ports, and for closing the second and third valves against flow between their ports while opening the first and fourth valves to permit flow between their ports in order to provide connections for power and exhaust for the motor to select its direction of operation, the said direction control means comprising an individual actuator for each of said off-on valves, each of said actuators being adapted to open and close the off-on valves in accordance with a signal supplied thereto; and a pair of signal sources, a first of which is connected to the actuators of the first and fourth valves and the other of which is connected to the actuators of the second and third valves.

2. A control for controlling application of power from a power source to a first and a second reversible motor, each of which motors is engaged to a machine tool member and is adapted to move said member in both directions along respective first and second axes, the control serving to interconnect an appropriate side of the respective motors to a power source for causing the selected motor operation, said control comprising: an exhaust conduit; two sets of four off-on valves, a first and a second valve of each set each having a pair of ports, a first port of all of said first and second valves adapted to be connected to said power source, the second port of each first valve adapted to be connected to a respective motor for passing power to its respective motor to operate it in one direction, and the second port of each second valve adapted to be connected to a respective motor for passing power thereto to operate its respective motor in the other direction; a third and fourth valve of each set, each valve having a pair of ports, a first port of each of the third valves adapted to be connected to the respective motor of its set to operate it in the same direction as the first valve of its set, and a first port of each of the fourth valves adapted to be connected to the respective motor of its set to operate it in the same direction as the second valve of its set, the second ports of all of the third and fourth valves adapted to be connected to said exhaust conduit; and a pair of direction control means, one for each set for simultaneously and selectively closing the first and fourth valves against flow between their ports while opening the second and third valves for flow between their ports, and for closing the second and third valves against flow between their ports, while opening the first and fourth valves to permit flow between their ports in order to provide connections for power and exhaust for the respective motors to select their directions of operation, each said direction control means comprising an individual actuator for each of the off-on valves of its respective set, each of said actuators being adapted to open and close its respective off-on valves in accordance with a signal supplied thereto; and a pair of signal sources for each direction control means, a first of which is connected to the actuators of the first and fourth valves and the other of which is connected to the actuators of the second and third valves; a pair of manifolds, each connected to the second ports of third and fourth direction control valves of a respective set; two sets of circuit selector means, each set comprising three off-on circuit selector valves with first and second ports, all first ports of the circuit selector valves of each respective set adapted to be connected to said manifold, only one of said three off-on valves being actuable to permit fluid flow at any one time, the second port of one of said circuit selector valves of each set being adapted to be connected to means for governing flow of exhaust fluid in a first manner, and the second ports of the other two of said circuit selector valves being adapted to be connected to means for governing flow of exhaust fluid is a second manner, and means for selectively actuating the circuit selector valves.

3. Apparatus according to claim 2 in which the means for governing flow in a first manner comprises a tracer valve which limits flow of fluid therethrough and in which the means for governing flow in a second manner comprises an adjustable restrictor valve.

4. Apparatus according to claim 2 in which the direction control means comprises an actuator for each of said direction control valves, said actuators each being capable of turning on and off the direction control valves in accordance with a signal supplied thereto; a pair of signal sources for the direction control valves of each axis, a first signal source being connected to the actuators of the first and fourth direction control valves and the other of which is connected to the actuators of the second and third direction control valves; said signal sources comprising conduits connected to said actuators, each of said conduits being connected to a pilot valve that has a pressure-transmitting condition and a venting condition applicable to its respective conduit, an actuator for each pilot valve, and in which a selector supplies pilot power to the actuators of said pilot valves to position one of the same to transmit fluid pressure to one of said conduits, thereby actuating some of said actuators of the direction control valves, and means for discharging said pilot power at the end of a desired movement of the machine tool member, thereby removing fluid pressure from the respective conduit, deenergizing the respective direction control valves and stopping the respective motor operation.

5. Apparatus according to claim 4 in which said pilot power is supplied to the pilot valve actuators through an orifice, and in which a pressure-release type trip device is actuable by the member at the end of a desired movement for discharging the pilot power, and in which selector actuators are provided for selecting the position of said selectors, said selector actuators being adapted to receive actuating pressure when the trip device is actuated as a result of completion of desired member movement.

6. Apparatus according to claim 5 in which movement along one of said axes is rendered intermittent by a valve in one of said conduits, which valve is opened only when the trip device dumps pilot pressure at the end of a desired machine tool movement.

7. Apparatus according to claim 6 in which pressure for energizing the actuators of the direction control valves is provided to a timer circuit, said timer circuit comprising a conduit having a significant volume, and a restrictor valve for limiting the rate of fluid discharge from said conduit.

8. Apparatus according to claim 7 in which means for opening and closing the restrictor valve in the exhaust line is controlled by pressure in the timer line.

9. Apparatus according to claim 8 in which a pair of "flip-flop" valves are provided, said "flip-flop" valves being connected to the actuators for the selectors for determining which of the selectors is to receive pressure therefrom, said "flip-flop" valves receiving pressure for actuation of said selector actuators.

10. Apparatus according to claim 6 in which the actuators of the first circuit selector valve for one axis and the third selector valve of the other axis are connected to a first source of pilot pressure, the actuators of the second selector valves in each axis are connected to a second source of pilot pressure, and the actuators of the remaining circuit selector valves are connected to a third source of pilot pressure, and means for providing pilot pressure from only one of said sources at a time.

11. Apparatus according to claim 6 in which means are provided for automatically shutting off the machine when trip devices along two axes are simultaneously actuated by the machine tool member.

12. Apparatus according to claim 11 in which the means for automatically shutting off the machine comprises a master power valve, a master power valve actuator, and two sources of pilot pressure for said power valve actuator, one of said sources comprising pressure for direction control valves on each axis, simultaneous venting of both sources by their respective trip means de-energizing the master power valve actuator and stopping the machine.

13. Apparatus according to claim 5 in which a unidirectional check valve is placed between each trip device and the respective pilot valve actuator, permitting flow only from the actuator toward the trip device for eliminating the volume of the conduit leading to the trip device from that in which pressure must be lowered in order to deactuate the pilot valve actuator.

References Cited in the file of this patent

UNITED STATES PATENTS

| | | |
|---|---|---|
| 2,293,555 | Mercier | Aug. 18, 1942 |
| 2,341,692 | Clade | Feb. 15, 1944 |
| 2,343,912 | Lauck | Mar. 14, 1944 |
| 2,475,326 | Johnson | July 5, 1949 |
| 2,487,436 | Goehring | Nov. 8, 1949 |
| 2,706,892 | Fritschi et al. | Apr. 26, 1955 |
| 2,726,581 | Roehm | Dec. 13, 1955 |
| 2,740,383 | Hallberg et al. | Apr. 3, 1956 |
| 2,743,584 | Rosebrook | May 1, 1956 |
| 2,767,621 | Scherrer | Oct. 23, 1956 |
| 2,791,885 | Sassen | May 14, 1957 |
| 2,800,839 | Horlacher | July 30, 1957 |
| 2,891,384 | Moore | June 23, 1959 |
| 2,958,501 | Pickett et al. | Nov. 1, 1960 |